United States Patent [19]
Witzel

[11] Patent Number: 4,712,611
[45] Date of Patent: Dec. 15, 1987

[54] HEATING OR AIR-CONDITIONING VENTILATION UNIT FOR MOTOR VEHICLES

[75] Inventor: Karlheinz Witzel, Stuttgart, Fed. Rep. of Germany

[73] Assignee: Sueddeutsche Kuehlerfabrik Julius Fr. Behr GmbH & Co. KG, Stuttgart, Fed. Rep. of Germany

[21] Appl. No.: 867,511

[22] Filed: May 28, 1986

[30] Foreign Application Priority Data

Jun. 7, 1985 [DE] Fed. Rep. of Germany ....... 3520548

[51] Int. Cl.⁴ .............................................. F28F 13/12
[52] U.S. Cl. .................................. 165/122; 165/159; 165/903; 415/178; 415/209
[58] Field of Search ..................... 165/122, 159, 903; 415/178, 209, 177, 207

[56] References Cited

U.S. PATENT DOCUMENTS

| 2,025,802 | 12/1935 | Child | 165/903 X |
| 2,768,814 | 10/1956 | Frey et al. | 165/903 X |
| 2,808,237 | 10/1957 | Fosnes | 165/903 X |
| 3,374,831 | 3/1968 | Sieverding | 165/122 |
| 3,874,191 | 4/1975 | Hudson | 165/121 X |

FOREIGN PATENT DOCUMENTS 7739556 12/1977 Fed. Rep. of Germany .

Primary Examiner—Albert W. Davis, Jr.
Assistant Examiner—Richard P. Cole
Attorney, Agent, or Firm—Schwartz, Jeffery, Schwaab, Mack, Blumenthal & Evans

[57] ABSTRACT

A ventilation unit for heating or air-conditioning in a motor vehicle. The unit includes a blower and a heat exchanger, with a diffuser positioned in the flow of air from the blower. The diffuser spreads the air flow so that it substantially covers the heat exchanger area. A grid positioned between the diffuser and the heat exchanger aids in spreading the flow of air to the peripheral portions of the heat exchanger.

21 Claims, 7 Drawing Figures

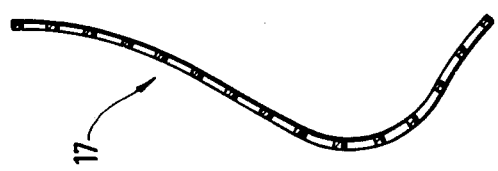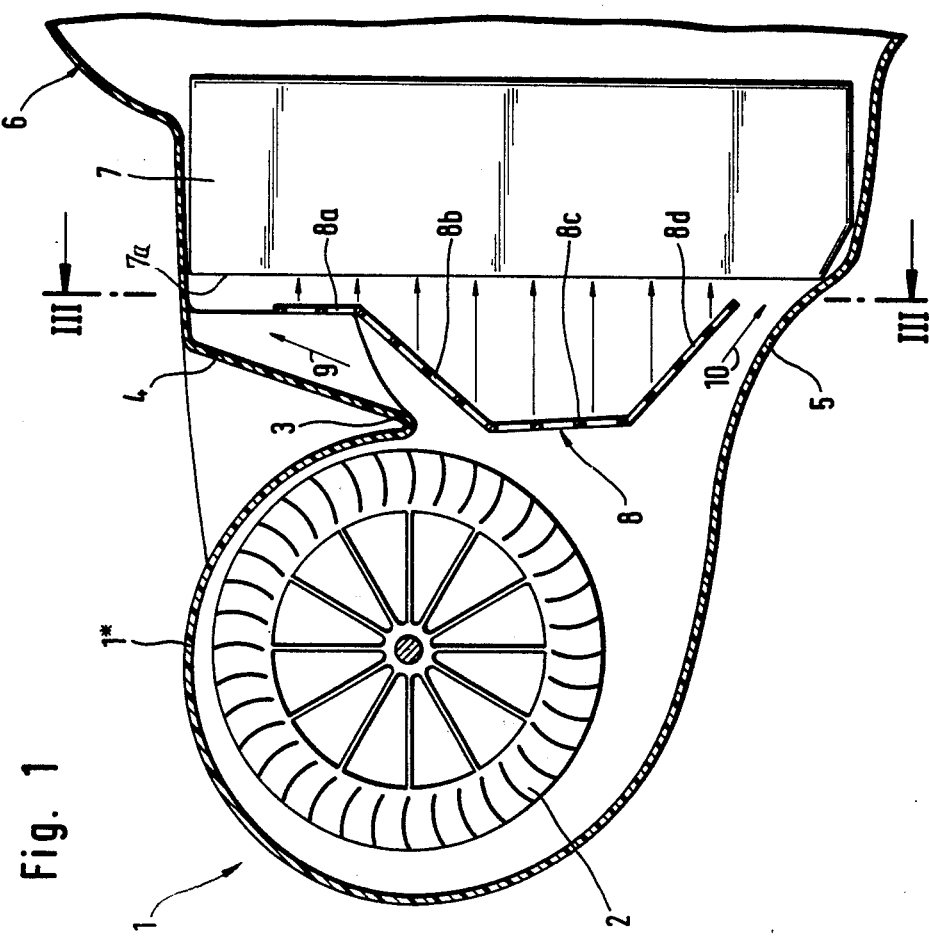

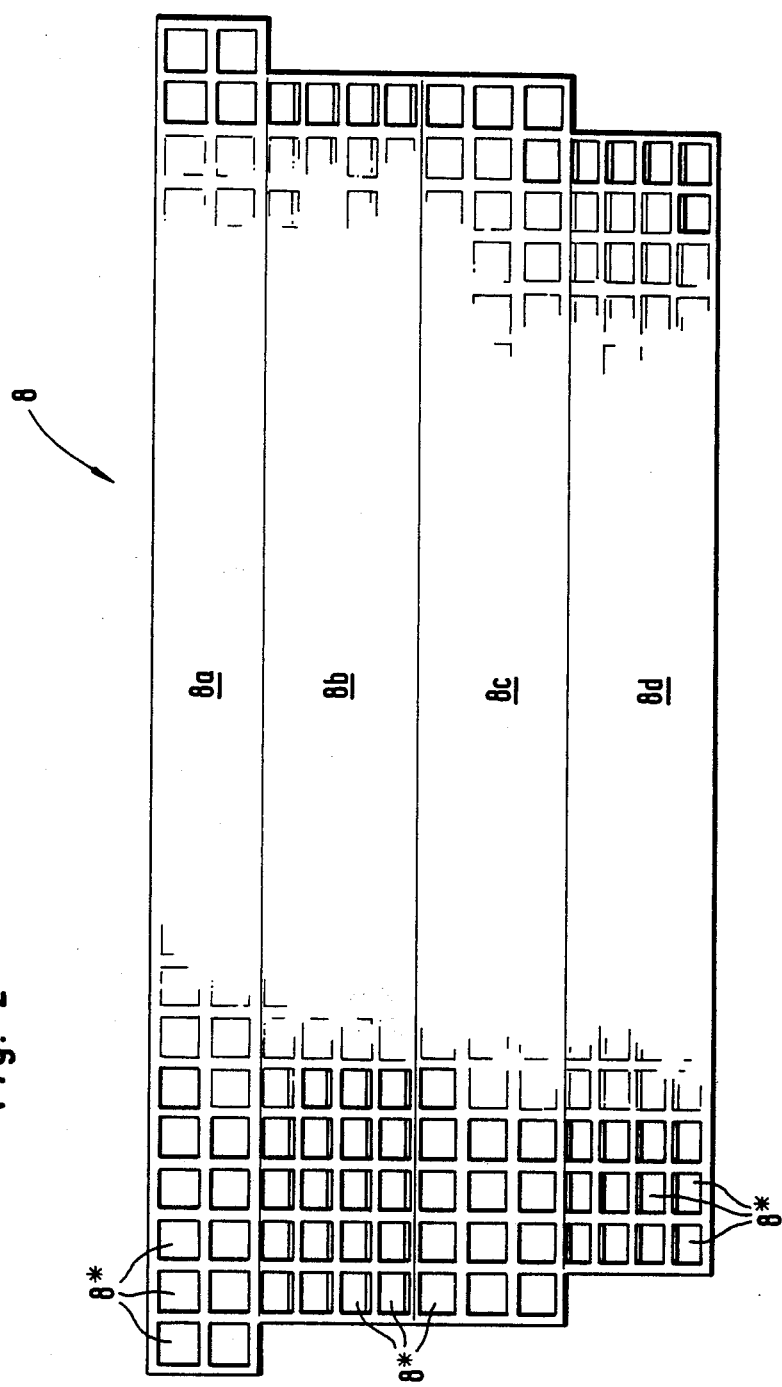

HEATING OR AIR-CONDITIONING VENTILATION UNIT FOR MOTOR VEHICLES

BACKGROUND OF THE INVENTION

The invention relates to a heating or air-conditioning ventilation unit having a radial blower. The unit can be used, for example, in motor vehicles.

Heating or air-conditioning units of this type are known. In passenger motor vehicles in particular, only a limited construction space is available for the heating or air-conditioning unit, so that the diffuser of the radial blower has to be kept as short as possible. However, since the end face of the heat exchanger connected on the outlet side of the blower is considerably larger than the discharge cross-section of the blower, extreme spreading of the flow over a short distance is necessary. This applies not only with regard to the radial widening of the spiral in the radial blower, but also with regard to the axial widening in the diffuser.

Because of the large opening angle of the diffuser and the extreme cross-sectional widening connected therewith, air is admitted to the heat exchanger non-uniformly, with less air flowing through the edge areas of the heat exchanger than the center part. Moreover, return flows form in the diffuser which, apart from the above-mentioned non-uniform admission to the heat exchanger, lead to efficiency losses and to increased noise generation.

DISCLOSURE OF THE INVENTION

It is accordingly an object of the invention to provide a heating or air-conditioning ventilation unit having a uniform admission of air to the heat exchanger.

It is another object of the invention to provide a heating or air-conditioning unit, as above, which achieves a reduction in operation noise.

It is still another object of the invention to provide a heating or air-conditioning unit, as above, having a size comparable to prior art units.

These objects are achieved by a heating or air-conditioning ventilation unit, which comprises a radial blower disposed in a first housing, a diffuser defined by upper and lower wall parts, the diffuser adjoining the first housing and spreading a flow of air from the blower, a heat exchanger positioned in a second housing adjoining the diffuser and having a rear surface facing the diffuser, and a grid having a profile and positioned between the diffuser and the heat exchanger, a portion of the grid extending into the diffuser.

BRIEF DESCRIPTION OF THE DRAWINGS

Exemplary embodiments of the invention as described in greater detail below with reference to the drawings, in which:

FIG. 1 shows a section through a radial blower and a heat exchanger arranged on the outlet side of the radial blower.

FIG. 2 shows the front view of a profiled grid wall;

FIG. 7 shows an embodiment variant of the grid wall in FIG. 1.

DETAILED DESCRIPTION OF THE PREFERRED EMBODIMENTS

Figure 3:
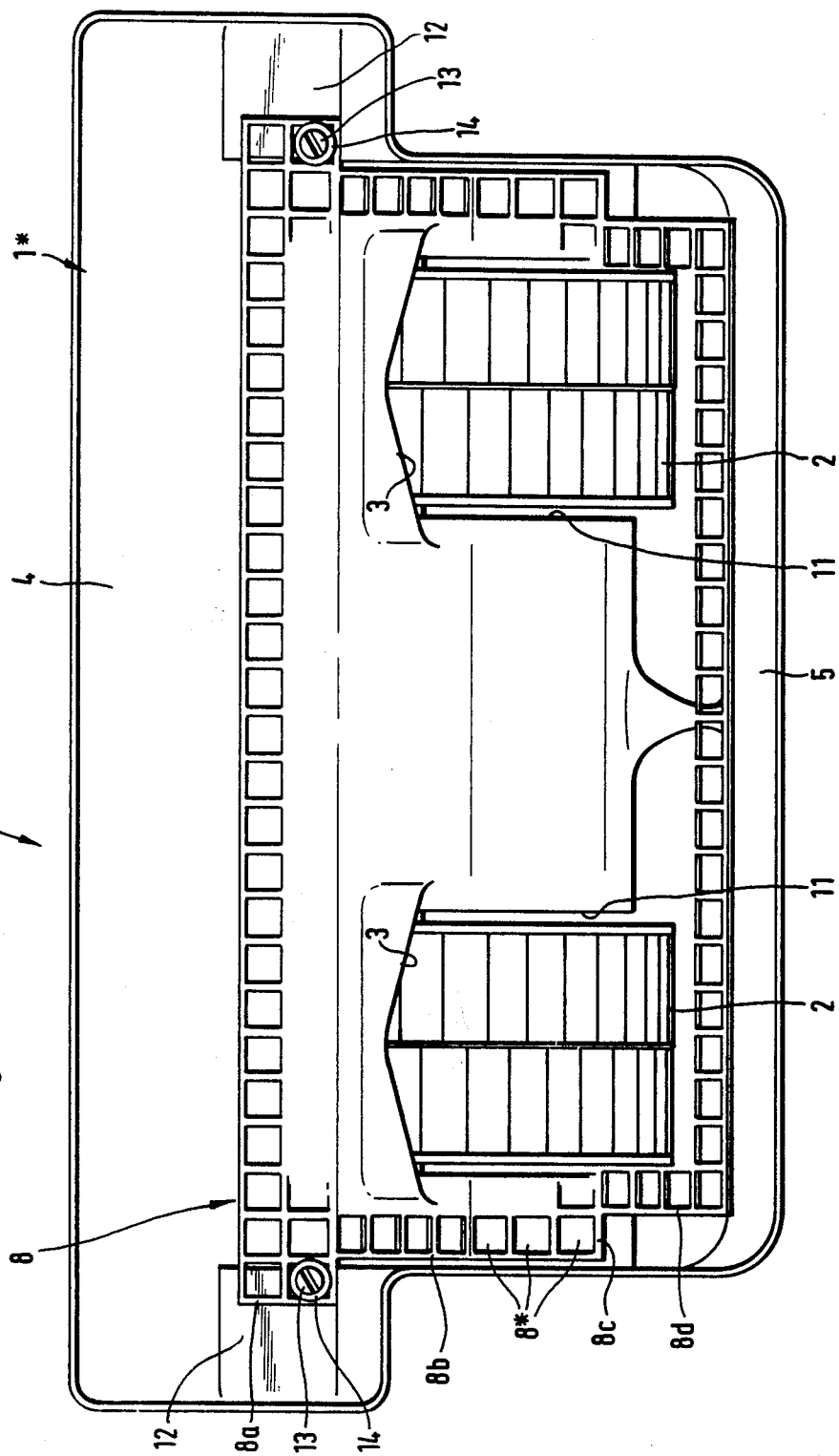
FIG. 3 shows a section along line III—III in FIG. 1.

The essential advantages of the invention can be considered to be that a cost-effective solution for uniformly admitting air to the heat exchanger is achieved with simple means, the generation of noise in the blower is reduced, and existing systems can be re-equipped in a manner such that only portions thereof need be replaced, and thus the construction of the existing systems or units can be kept largely unchanged so that only a small expenditure is necessary. A further advantage is that the dimension of the unit according to the invention is suitable for both new installations and for re-equipping existing systems.

According to an advantageous further development of the invention, the profiled grid wall, in cross-section, has the approximate shape of a trapezoid with an open base, with the portions which form the sides of the trapezoid being directed into the diffuser. As a result of this shape on the one hand, the air flow is partially deflected to the upper and lower edge areas, so that an improved air flow results there, and in addition the greater distance of the grid wall from the center area of the heat exchanger enables the flow to be homogenized. However, these advantages can also be achieved by an alternative embodiment of the grid wall, as described hereinbelow.

Particularly expedient are arrangements in which the profiled grid wall extends over about 60% to 80% of the end face of the heat exchanger. Moreover, air is to flow if possible around the upper and lower edge of the grid wall.

An embodiment variant of the grid wall which is particularly suitable for the re-equipping of units installed in vehicles is that the grid wall has an essentially L-shaped cross-section. Such a grid wall preferably comprises at least one portion which is provided with an outwardly directed, slight curvature and extends approximately parallel to the end face of the heat exchanger, and one portion which is of flat configuration and projects into the diffuser. It is also proposed that the radial blower has two blower impellers which are arranged at an axial distance from one another. In this case, the grid wall has two of the arched portions, the width of which corresponds to the axial width of the blower impellers and the distance of which from one another is equal to the distances between the blower impellers. In this way, the air flow into the area located between the blower impellers and into the edge areas is partially deflected, so that the flow is made uniform over the entire cross-section of the diffuser. Further portions of the profiled grid wall can be provided in the area between the blower impellers as a further means of influencing the flow. If the grid wall is to have a higher flow resistance in the area of the portions close to the blower impellers, the corresponding portions can be provided with additional grid elements.

The grid wall is preferably made of light alloy or of plastic. This ensures that the weight of the heating or air-conditioning unit is increased by only 50 to 80 g, that is, only slightly. Depending on the structure of the grid, in other words depending on its permeability, the choke effect and therefore the deflection of the flow can be influenced. Grid structures have proved to be particularly suitable in which the ratio of the entire area of the grid wall to the area of all openings is about 1:0.6 to 1:0.8, preferably 1:0.7.

FIG. 1 shows a radial blower 1 with a spiral housing 1*, a radial blower impeller 2, a tongue 3 and a diffuser formed by wall parts 4 and 5. Adjoining the wall parts 4 and 5 forming the diffuser is a housing 6 in which is arranged a heating or air-conditioning unit. In the area of the housing 6, which area is adjacent to the radial blower 1, is arranged a heat exchanger 7, over the entire end face or rear surface 7a of which extends the widened end of the diffuser.

Inserted between the heat exchanger 7 and the radial impeller 2 is a profiled grid wall 8 which comprises four portions 8a to 8d. Because the portions 8a to 8d are disposed at an angle to one another, a body results which is trapezoidal in cross-section and which extends from the widened part into the narrowed part of the diffuser and virtually over the entire end face of the heat exchanger 7. Since the grid wall 8 is made in a wide mesh, air can penetrate through the grid wall 8 in distributed manner over its entire area, but with a displacement effect being produced in addition toward the upper and lower edge, as indicated by the arrows 9 and 10. Since the grid wall 8 is at a distance from the upper and lower housing wall, it is possible for air to flow around the grid wall in this area. As a result of the grid wall 8, therefore, no return flows form in the diffuser and, moreover, an air admission is achieved which is uniform over the entire end face of the heat exchanger 7.

FIG. 2 shows a front view of the grid body 8, with this in turn comprising the portions 8a, 8b, 8c and 8d. This representation shows that the grid wall 8 has a plurality of regularly arranged openings 8* and gives some idea of the ratio of the overall area of the grid wall 8 to the area of all openings 8*, which in the present case is about 1:0.7. Of course, other shapes of grid structure are also possible, and other ratios of overall area to opening area can also be considered, with the installation conditions and in particular the configuration of the diffuser having to be taken into account in each case.

FIG. 3 shows a view along line III—III in FIG. 1. In this view, the blower housing is designated as 1*, in which an electric motor (not shown in the drawing) is arranged which drives two radial blower impellers 2. The electric motor is located between the two radial blower impellers 2. In each case one blower impeller 2 projects through one corresponding opening 11 each into the diffuser, with the openings 11 in each case being defined at the upper end by the tongue 3.

Inserted into the diffuser is the grid wall 8, the outer ends of which of the portion 8a bear against lateral abutment faces 12 of the blower housing 1. The grid wall 8 is fixed by means of screws 13 and if necessary washers 14 to the housing 1, namely in the area of the abutment faces 12. Provided the grid wall 8 has adequate rigidity, this means of fixing is perfectly adequate; but in the case of thinner materials and therefore lower stability additional guidance of the lateral edges in the area of the portion 8c can be provided.

Because of its shape, the grid wall 8 described in FIGS. 1 to 3 is to be assembled before fitting together the blower housing 1 and the housing 6 of the heating or air-conditioning unit. Since the use of a profiled grid wall 8 has proved to be particularly favorable with regard to the flow conditions and noise generation in a heating or air-conditioning unit, an embodiment variant is proposed in FIGS. 4 to 6 which is suitable for re-equipping in units already installed in the vehicle without requiring a great assembly effort.

Figure 4:
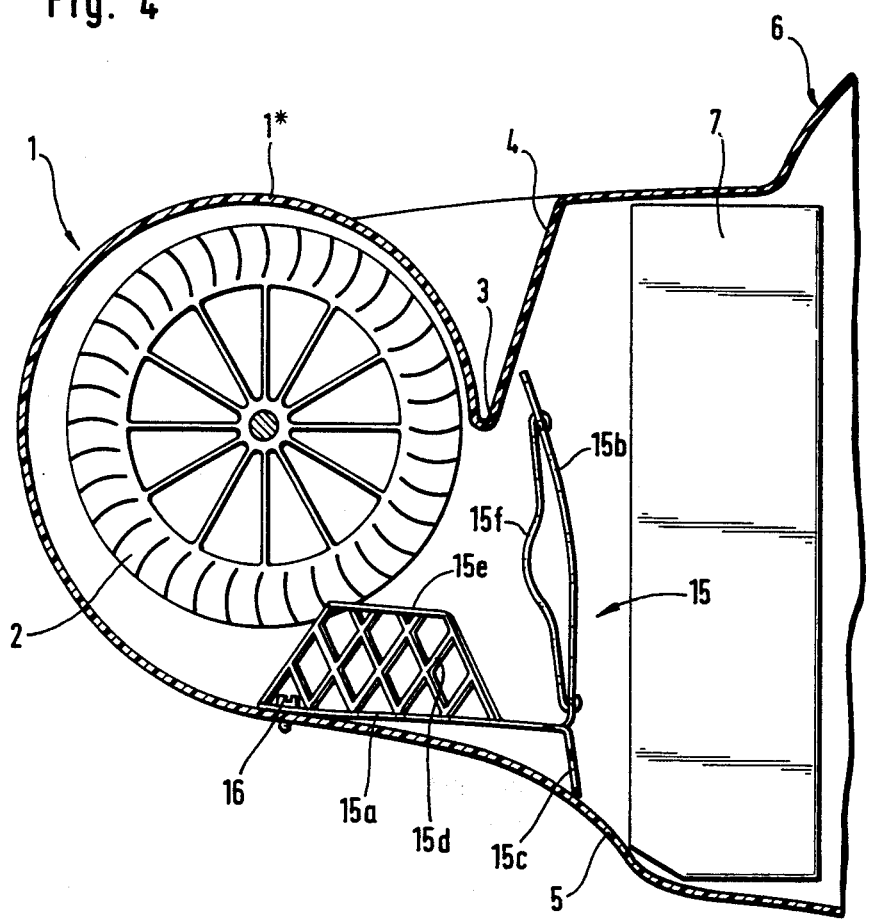
FIG. 4 shows a section through a radial blower with a second embodiment of the profiled grid according to the invention.

FIG. 4 shows a section through a radial blower 1 which is the same as that in FIG. 1, with the reference numerals being taken over for identical parts. Inserted into the diffuser is a profiled grid wall 15 which essentially comprises two portions 15a and 15b disposed at an angle to one another, of which the portion 15a is flat and the portion 15b is arched slightly outwards. The portion 15a projects far into the diffuser; the portion 15b extends approximately parallel to the end face of the heat exchanger and therefore lies essentially across the direction of the air flow. A further portion 15c is bent at an angle from the portion 15a in the opposite direction to the portion 15b. Moreover, further portions are bent at an angle from the portion 15a, with portions 15d extending at right angles to the plane of the portion 15a, but running at a slope in the longitudinal direction, and portions 15e extending parallel to the position 15a. The function of these portions 15a to 15e and their arrangement in the unit will be described below with reference to FIGS. 5 and 6. In the present case, the grid material can be the same as in the exemplary embodiment of FIGS. 1 to 3. In the area of the portion 15b is located an additional grid element 15f which has a curvature directed in the opposite direction to the portion 15b.

Figure 5:
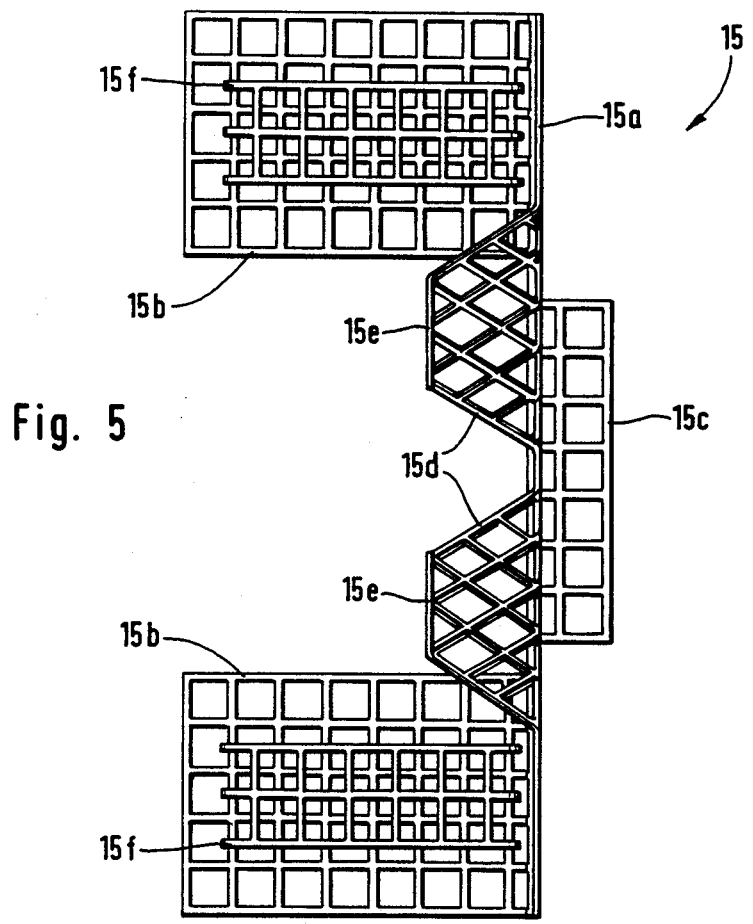
FIG. 5 shows a view of the grid according to FIG. 4 as viewed in the direction of the air flow.

FIG. 5 shows the view of the profiled grid wall 15 in the oncoming direction of air flow, from which emerges the planar extension of the respective portions 15a to 15f. The two portions 15b are of such a size that they have approximately the axial width of the fan impellers, and the distance between the portions 15b corresponds to the distance of the fan impellers from one another.

Figure 6:
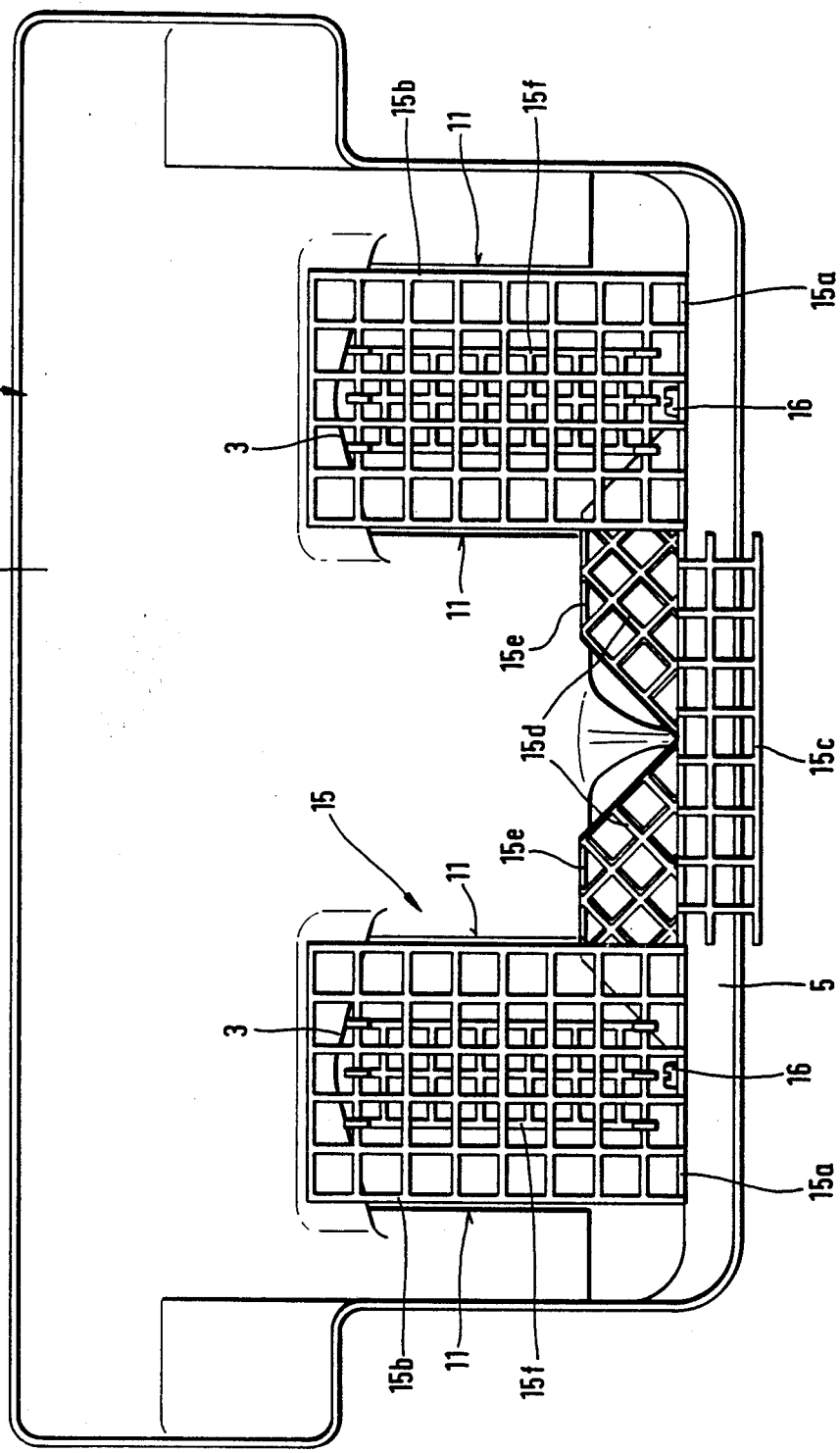
FIG. 6 shows a view according to FIG. 3 with a profiled grid wall according to FIGS. 4 and 5.

To increase the air resistance and therefore to intensify the deflection of the air flow, the center area of each portion 15b is provided with the grid element 15f which partially overlaps this portion 15b. The portions 15d and 15e are arranged in the area between the portions 15b, through which portions 15d and 15e an additional deflection is achieved in the direction of a wall part defining the diffuser. FIG. 6 shows an embodiment variant from FIG. 3 having the grid wall 15 according to FIGS. 4 and 5, with the blower housing 1 with the wall parts 4 and 5 which form the diffuser being shown. The arrangements of the openings 11 with the tongues 3 and the radial blower impellers 2 is identical to that in FIG. 3. In can be seen from this representation that the portions 15b of the grid wall 15 have approximately the width of the blower impellers 2. Since the grid elements 15f are located in the main flow of the blower impellers 2, the latter produce an intensified lateral deflection of the flow, so that the air is well distributed, even into the edge areas. The portion 15c points in the opposite direction. The two portions 15a extend together virtually over the entire width of the diffuser, with a V-shaped cut-out arising as a result of the angled portions 15d and 15e. The portions 15d arranged toward the blower produce an intensified effect on the flow in the area between the blower impellers.

Assembling the grid wall 15 for re-equipping in units already installed in vehicles does not require any great effort, because only the blower motor, together with the two radial blower impellers 2, needs to be removed for this purpose. The grid wall 15 can then be incorporated into the diffuser through one of the openings 11 and fixed by means of screws 16 which are easily accessible through the openings 11.

FIG. 7 shows a grid wall 17 which extends over the same area as the grid wall 8; but in contrast to the latter it has an arched cross-sectional shape.

What is claimed is:

1. A heating or air-conditioning ventilation unit for a motor vehicle, comprising:
   a radial blower disposed in a first housing and having a generally rectangular outlet opening of a first size;
   a second housing closely adjacent to said first housing and having a cross-sectional size substantially larger than the size of said outlet opening;
   a diffuser defined by upper and lower wall parts connecting said first housing and said second housing, wherein said upper and lower wall parts open from the size of said outlet opening to the cross-sectional size of said second housing with a wide opening angle;
   a heat exchanger positioned in said second housing in close proximity to said diffuser and having a rear surface which faces said diffuser and which substantially fills the cross-section of said second housing; and
   means for providing a uniform admission of air to said heat exchanger, said means comprising a grid comprised of portions of substantially equal thickness wherein the thickness is small in comparison to the area of the grid, said grid being positioned between said diffuser and said heat exchanger and having a generally convex profile, with a portion of said profile of said grid extending into said diffuser, wherein said grid extends over about 60% to 80% of the end face of said heat exchanger and wherein the ratio of the open area to the total area of said grid is from about 0.6:1 to about 0.8:1.

2. A ventilation unit as claimed in claim 1, wherein said grid is spaced from said upper and lower wall parts of said diffuser, and comprises four sections of generally planar configuration making up the area of said grid, each said section being disposed at an angle relative to an adjacent section.

3. A ventilation unit as claimed in claim 2, wherein said grid comprises a trapezoidal profile having a base said base being open and facing said heat exchanger, with a side opposite said base extending farthehst into said diffuser.

4. A ventilation unit as claimed in claim 1, wherein said radial blower includes two blower impellers arranged in spaced relationship in said first housing.

5. A ventilation unit as claimed in claim 1, wherein the ratio of the open area to the total area of said grid is about 0.7:1.

6. A ventilation unit as claimed in claim 1, wherein said grid comprises means, including a sufficiently open mesh structure for permitting penetration of air flow and for distributing said flow through said mesh structure and displacing air toward said upper and lower wall parts of said diffuser.

7. A ventilation unit as claimed in claim 1, wherein said grid is arched in a direction towards said blower.

8. A ventilation unit as claimed in claim 1, wherein said grid comprises a light alloy or plastic.

9. A ventilation unit as claimed in claim 1, wherein said grid includes first and second portions forming an angle, said first portion extending in a first direction into said diffuser, and said second portion extending in a second direction substantially parallel to said rear surface of said heat exchanger and towards said upper wall part of said diffuser.

10. A ventilation unit as claimed in claim 9, wherein said first portion is flat.

11. A ventilation unit as claimed in claim 9, wherein said grid further includes a third portion extending at an angle from said first portion in a direction opposite said second direction.

12. A ventilation unit as claimed in claim 13, wherein said grid includes fourth and fifth portions, said fourth portion extending at substantially a right angle from said first portion, and said fifth portion extending from said fourth portion in a direction substantially parallel to said first portion.

13. A ventilation unit as claimed in claim 12, wherein said radial blower includes two blower impellers arranged in spaced relationship in said first housing, and wherein said unit includes a separate first grid associated with each said blower impeller, said fourth and fifth portions of each said first grid being positioned adjacent a space between said blower impellers, said fourth and fifth portions deflecting said flow of air from said space between said blower impellers to said wall parts of said diffuser.

14. A ventilation unit as claimed in claim 13, wherein said second portions of said first grids each have a width substantially equal to a width of a respective said blower impeller.

15. A ventilation unit as claimed in claim 9, wherein said second portion is arched in a direction toward said rear surface of said heat exchanger.

16. A ventilation unit as claimed in claim 15, wherein said unit includes a second grid secured to said second portion of said first grid, said second grid partially overlapping said second portion, thereby increasing the resistance to said flow of air through said second portion.

17. A ventilation unit as claimed in claim 16, wherein said second grid is arched in a direction opposite to said arch of said second portion.

18. A ventilation unit as claimed in claim 1, wherein said grid has a generally rectangular shape.

19. A ventilation unit as claimed in claim 1, wherein said radial blower comprises a spiral housing.

20. A ventilation unit as claimed in claim 1, wherein said diffuser opens non-symmetrically.

21. A ventilation unit as claimed in claim 20, wherein said grid has a non-symmetrical profile.

* * * * *